US012547920B2

(12) United States Patent
Vinet et al.

(10) Patent No.: US 12,547,920 B2
(45) Date of Patent: Feb. 10, 2026

(54) QUANTUM PROCESSING ELEMENT AND SYSTEM

(71) Applicants: Diraq Pty Ltd, Elizabeth Bay (AU); Commissariat a L'energie Atomique Et Aux Energies Alternatives, Paris (FR)

(72) Inventors: Maud Vinet, Paris (FR); Louis Hutin, Paris (FR); William James Gilbert, Kensington (AU); Andre Luiz Saraiva De Oliveira, Kensington (AU); Christopher Colin Escott, Kensington (AU)

(73) Assignees: Diraq Pty Ltd, Elizabeth Bay (AU); Commissariat a L'energie Atomique Et Aux Energies Alternatives, Paris (FR)

(*) Notice: Subject to any disclaimer, the term of this patent is extended or adjusted under 35 U.S.C. 154(b) by 720 days.

(21) Appl. No.: 17/912,095

(22) PCT Filed: Mar. 16, 2021

(86) PCT No.: PCT/AU2021/050232
§ 371 (c)(1),
(2) Date: Sep. 16, 2022

(87) PCT Pub. No.: WO2021/184065
PCT Pub. Date: Sep. 23, 2021

(65) Prior Publication Data
US 2023/0177376 A1    Jun. 8, 2023

(30) Foreign Application Priority Data

Mar. 16, 2020  (AU) ................. 2020900803

(51) Int. Cl.
H10D 64/20 (2025.01)
B82Y 10/00 (2011.01)
G06N 10/40 (2022.01)
H10D 48/00 (2025.01)

(52) U.S. Cl.
CPC .................................. G06N 10/40 (2022.01)

(58) Field of Classification Search
CPC ........ G06N 10/40; G06N 10/20; H10D 64/27; H10D 30/402; H10D 48/3835;
(Continued)

(56) References Cited

U.S. PATENT DOCUMENTS

| 10,572,814 | B2* | 2/2020 | Friesen | .................. G06N 10/70 |
| 2019/0123183 | A1 | 4/2019 | Hutin et al. | |
| 2019/0266509 | A1* | 8/2019 | Hutin | .................. H10D 84/038 |

FOREIGN PATENT DOCUMENTS

| EP | 2075745 A1 | 7/2009 |
| EP | 3082073 A1 | 10/2016 |

(Continued)

OTHER PUBLICATIONS

Hu et al., Double quantum dot with integrated charge sensor based on Ge/Se heterostructure nanowires, Harvard University, Jun. 15, 2007, pp. 1-5 (Year: 2007).*

(Continued)

*Primary Examiner* — Nghia M Doan
(74) *Attorney, Agent, or Firm* — Lee & Hayes, P.C.

(57) ABSTRACT

The present disclosure provides a quantum processing device comprising: one or more functional nanowires, each functional nanowire connected to at least one of a source and a drain; a sensing nanowire spaced from the one or more functional nanowires and connected to at least one of a source and a drain; one or more gate electrodes capacitively coupled with each of the one or more functional nanowires; one or more electrodes capacitively coupled with the sensing (Continued)

nanowire; and a floating coupler positioned between and electrostatically coupling the one or more functional nanowires and the sensing nanowire; and a controller connected to the one or more gates of the sensing nanowire and the one or more gates of the one or more functional nanowires.

20 Claims, 14 Drawing Sheets

(58) Field of Classification Search
CPC .... H10D 62/121; H10D 84/83; H10D 48/383; H10D 62/10; H10D 64/205; B82Y 10/00; H10F 77/1433; H10H 20/811
See application file for complete search history.

(56) References Cited

FOREIGN PATENT DOCUMENTS

| WO | WO-2009072983 A1 * | 6/2009 | ............. H10D 30/43 |
| WO | 20170190030 A1 | 11/2017 | |

OTHER PUBLICATIONS

A Ge/Si heterostructure nanowire-based double quantum dot with integrated charge sensor, Yongjie Hu et al., www.nature.com/naturenanotechnology, Sep. 30, 2007, Cambridge, Massachusetts, 4 pages.

SOI CMOS technology for quantum information processing, "A path towards quantum bits and control electronics co-integration", L. Hutin et al., Grenoble, France, 4 pages.

Semiconductor Quantum Computation, Xin Zhang et al., "Synergetic Innovation Center of Quantum Information & Quantum Physics", University of Science and Technology of China, Hefei, Anhui 23006, China, 31 pages.

Extended European Search Report for EP Application No. 21770835.3, mailed Apr. 4, 2024, 13 pages.

International Search Report and Written Opinion for International Application No. PCT/AU2021/050232, mailed May 24, 2021, 10 pages.

Hu Y. et al., "A Ge/Si heterostructure nanowire-based double quantum dot with integrated charge sensor", Nature Nanotechnology vol. 2, pp. 622-625 (2007), abstract, Figure 1, p. 622 col. 2 doi:10.1038/nnano.2007.302.

Ansaloni F. et al., "Single-electron operations in a foundry-fabricated array of quantum dots", Nature Communications vol. 11, Article No. 6399 (2020) https://d0i.0rg/1 0.103 8/s41467-020-20280-3.

Voisin B. et al., "Few-Electron Edge-State Quantum Dots in a Silicon Nanowire Field-Effect Transistor", Nano Lett. 2014, 14, 2094-2098 dx.doi.org/10.1021/nl500299h.

Duan J. et al., "Remote Capacitive Sensing in Two-Dimensional Quantum-Dot Arrays", Nano Lett. 2020, 20, 7123-7128, abstract, Fig 1 and 2, p. 7123, 7124, 7125, 7127 https://doi.org/10.1021/acs.nanolett.0c02393.

* cited by examiner

QUANTUM PROCESSING ELEMENT AND SYSTEM

The present application claims priority from Australian provisional patent application number 2020900803 filed on 16 Mar. 2020, the contents of which are incorporated herein by cross-reference.

TECHNICAL FIELD

Aspects of the present disclosure are related to charge sensing, and particularly, but not exclusively, to charge sensing arrangements for a quantum dot array.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Large-scale quantum processing systems hold the promise of a technological revolution, with the prospect of solving problems which are out of reach with classical machines. To date, a number of different structures, materials, and architectures have been proposed to implement quantum processing systems and fabricate their basic information units (or quantum bits).

One way of fabricating quantum bits, for example, is to use silicon quantum dots. Quantum dots are tiny systems confined in all three spatial dimensions, for example, electrons in semiconductors confined via gate-defined electric fields and insulating materials. In one example, quantum dots can be formed using an interface between a $^{28}$Si substrate and a dielectric material. A confining arrangement is utilized for confining one or more electrons in the silicon substrate to form the quantum dot and a control arrangement (e.g., a gate) is formed on the dielectric material to control the confined electron (e.g., by applying a voltage to tune the electronic spin resonance frequency of the confined electron). One technique for fabricating such quantum dots and processing systems utilizing these quantum dots is described in International Patent Applications PCT/AU2014/000596 and PCT/AU2016/050713.

When a number of such quantum dots are fabricated at a suitable distance from each other, quantum information can be moved through the quantum dot array via spin shuttling or exchange mediated coupling of the electrons.

Electron spin-based quantum dots show high control fidelity and can leverage the fabrication technologies that already exist for the manufacture of metal-oxide-semiconductor-field-effect-transistors (MOSFETs), making them a popular choice for semiconductor-based quantum bits.

SUMMARY

In accordance with a first aspect, the present invention provides a quantum processing device comprising: one or more functional nanowires, each functional nanowire connected to at least one of a source and a drain; a sensing nanowire spaced from the one or more functional nanowires and connected to the at least one source and drain; one or more gate electrodes capacitively coupled to each of the one or more functional nanowires; one or more gate electrodes capacitively coupled to the sensing nanowire; a floating coupler positioned between and electrostatically coupling the one or more functional nanowires and the sensing nanowire; and a controller connected to the one or more gates of the sensing nanowire and the one or more gate electrodes of the one or more functional nanowires; wherein during operation, the controller is configured to apply biasing voltage to bias the one or more gate electrodes of the sensing nanowire and the gate electrodes of the one or more functional nanowires such that a sensing quantum dot is formed in the sensing nanowire and one or more functional quantum dots are formed in the one or more functional nanowires and the sensing quantum dot senses changes in electric charges in each of the one or more functional quantum dots.

According to some embodiments, the quantum processing system includes one functional nanowire and two gates associated with the functional nanowire.

In such embodiments, the floating coupler includes two floating gates.

During operation, in some embodiments, a potential difference is maintained between the sensing nanowire and the one or more functional nanowires to form one or more functional quantum dots in the one or more functional nanowires under the floating gates.

Further, in some embodiments, the sensing nanowire is coupled to two gates and the two gates are biased to the same voltage.

To form the functional quantum dots under the floating gates in the functional nanowire, in some embodiments, the sensing nanowire and the functional nanowire are biased in voltage relative to each other.

In some other embodiments, the quantum processing system includes one functional nanowire and the functional nanowire is coupled to multiple gates. In such cases, the floating coupler may be capacitively coupled with the sensing nanowire at one end and at the other end the floating coupler may include multiple branches, each branch forming a branch gate, where each branch is capacitively coupled with the functional nanowire.

Further, in such embodiments, a potential difference is maintained between the sensing nanowire and the functional nanowire to form functional quantum dots under one or more of the branch gates of the floating coupler.

In some other embodiments, the quantum processing system includes multiple functional nanowires and each functional nanowire is coupled to two or more gates. In such cases, the floating coupler includes a trunk section, multiple branch sections and each branch section comprises one or more leaf gates, and the end of the trunk section is coupled to the sensing nanowire whereas the leaf gates are coupled to with the functional nanowires.

Further, in such embodiments, a potential difference is maintained between the sensing nanowire and each of the functional nanowires to form functional quantum dots under one or more of the leaf gates of the floating coupler.

According to another aspect of the present disclosure there is provided a method for controlling operation of a quantum processing system. The quantum processing system includes one or more functional nanowires, a sensing nanowire spaced from the one or more functional nanowires, one or more gate electrodes capacitively coupled with each of the one or more functional nanowires and one or more electrodes coupled with the sensing nanowire, a floating coupler positioned between and electrostatically coupling the one or more functional nanowires and the sensing nanowire, and a controller connected to the one or more gates of the sensing nanowire and the one or more gates of the one or more functional nanowires. The method includes:

at the controller: receiving a current reading from the sensing nanowire; determining a biasing voltage to be applied to the one or more gates of the sensing nanowire based on the received current reading; determining a biasing voltage to be applied to the one or more gates of the one or more functional nanowires based on the received current reading; causing the determined biasing voltage to be applied to the one or more gates of the sensing nanowire; and causing the determined biasing voltage to be applied to the one or more gates of the one or more functional nanowires; wherein the biasing voltages are determined such that a sensing quantum dot is formed in the sensing nanowire and one or more functional quantum dots are formed in the one or more functional nanowires and the sensing quantum dot senses charge transition events in each of the one or more functional quantum dots.

In some embodiments, where the quantum processing system includes one functional nanowire and the functional nanowire is coupled to two gates, and the floating coupler comprises two floating gates, the method of the second aspect, maintains a potential difference between the sensing nanowire and the one or more functional nanowires to form one or more functional quantum dots in the one or more functional nanowires under the floating gates.

In such embodiments, the sensing nanowire may be coupled to two gates and the method includes determining and causing the same biasing voltage to be applied to the two gates of the sensing nanowire.

Further still, in some embodiments, the method of the second aspect includes biasing the sensing nanowire and the functional nanowire in voltage relative to each other to form the one or more functional quantum dots in the one or more functional nanowires.

In some other embodiments, where the quantum processing system includes one functional nanowire and the functional nanowire is coupled to multiple gates and where at one end, the floating coupler is coupled with the sensing nanowire and at the other end the floating coupler includes multiple branches, where each branch is coupled with the functional nanowire, the method of the second embodiment includes biasing the sensing nanowire and the functional nanowire in voltage relative to each other to form functional quantum dots under one or more of the branches of the floating coupler.

In yet other embodiments, where the quantum processing system includes multiple functional nanowires and each functional nanowire includes two or more gates and where the floating coupler includes a trunk section, multiple branch sections and each branch section comprises one or more leaf gates, and the end of the trunk section is coupled with the sensing nanowire whereas the leaf gates are coupled with the functional nanowires, the method of the second aspect includes biasing each of the functional nanowires in voltage relative to the sensing nanowire to form functional quantum dots under one or more of the leaf gates of the floating coupler.

Figure 1:
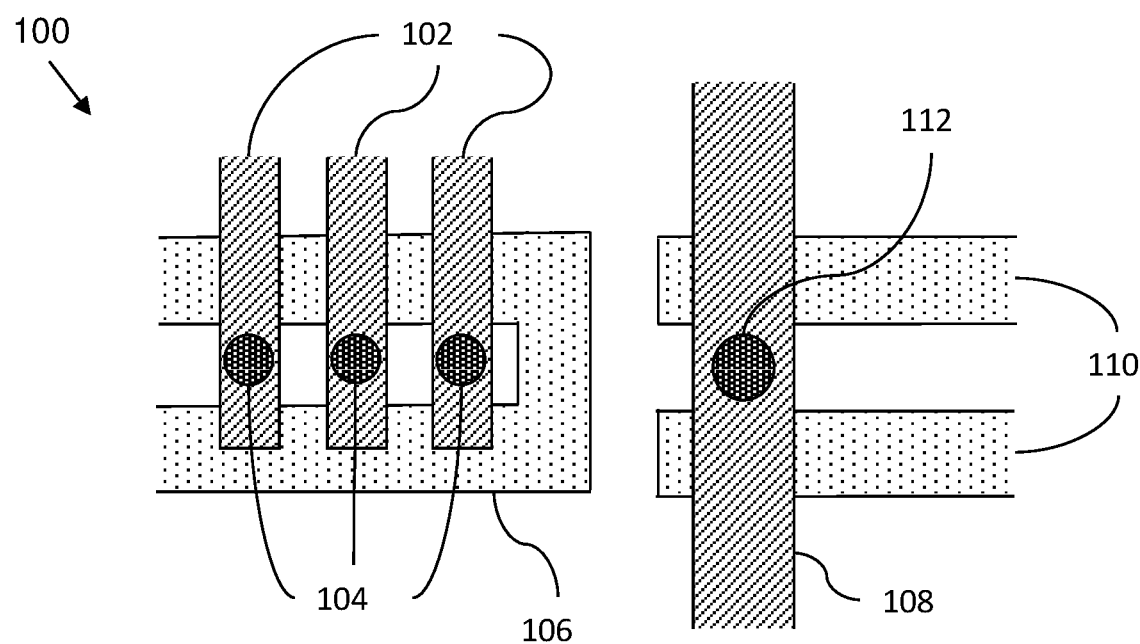
FIG. 1 is an example prior art arrangement for sensing charge events of a collection of quantum dots using a single electron transistor dot.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

Non-invasive charge sensing is an invaluable tool for the study of electron charge and spin states in nanostructured devices. It has been used to identify electron occupancy down to the single electron level and has made possible the single-shot readout of single electron spins confined in quantum dots. Further still, sensing devices are useful for sensing elementary charge transfer events occurring among quantum dots in multi-dot structures.

Generally speaking, a sensing device may be a remote electrometer. In some systems, charge sensing has been realized by using a quantum point contact (QPC) or a single electron transistor (SET) fabricated near quantum dots as a sensor. Both quantum point contacts (QPCs) and single electron transistors (SETs) possess high transconductance, making them sensitive to their local electrostatic environment and therefore excellent charge sensors.

A QPC can be conveniently integrated with lateral quantum dot structures formed in two-dimensional electron layers in GaAs/AlGaAs, and Si/SiGe and Si metal-oxide-semiconductor devices. SETs also have been integrated with quantum dots in a variety of structures including Ge/Si core/shell nanowires, carbon nanotubes, graphene and Si MOS devices.

In some previously known systems, SETs are placed close to quantum dots to induce a capacitive coupling between the two. For example, one SET may be placed adjacent one quantum dot, such that each SET senses an individual quantum dot. However, because SETs can often be larger than the quantum dots they are sensing, individual SETs do not make much sense for quantum processing systems that include tens, hundreds or even thousands of quantum dots (as fabrication of individual sensing devices for each quantum dot would essentially increase the quantum processing chip size by a factor of 2 or 3).

To overcome some of these issues, some systems may utilize a common SET to sense changes in electric charges for multiple quantum dots (e.g., 3 quantum dots). One such system is depicted in FIG. 1. In particular, FIG. 1 illustrates an example system where three quantum dots 104 are formed in a region where electrons are laterally confined 106. The quantum dots 104 are formed by applying a bias to gate 102 that enables accumulation of electrons. The lateral confinement can be created by electric fields due to a confinement barrier gate or an insulating material around a nanowire. The top gate 108 accumulates an electron gas under it such that current can be measured following the pathway defined by the gate 108. Gates 110 are then set to a voltage that forms a barrier for the electron gas, which defines a small region where electrons can tunnel in and out, which defines a single SET. The SET 112 is located nearby the confinement region 106 such that one SET is adjacent to a linear arrangement of multiple quantum dots and capacitively coupled to each of the quantum dots. Although this architecture allows one SET to sense multiple quantum dots, it has flaws.

For large numbers of quantum dots in the same nanowire or confinement region, sensitivity of the SET is lost because capacitive coupling between the quantum dot and SET decreases as the distance between the two increases and therefore there is an upper limit on the number of quantum dots that can be sensed by a single SET using this architecture, which is fixed based on quantum dot spacing and sensitivity of the SET device.

To circumvent the sensitivity of the SET and the distance trade-off, some designs utilize a strip of floating conductive material between the quantum dot and the sensor, thereby allowing the SET to be placed a greater distance away from the quantum dot than permitted by the system of FIG. 1.

Figure 2:
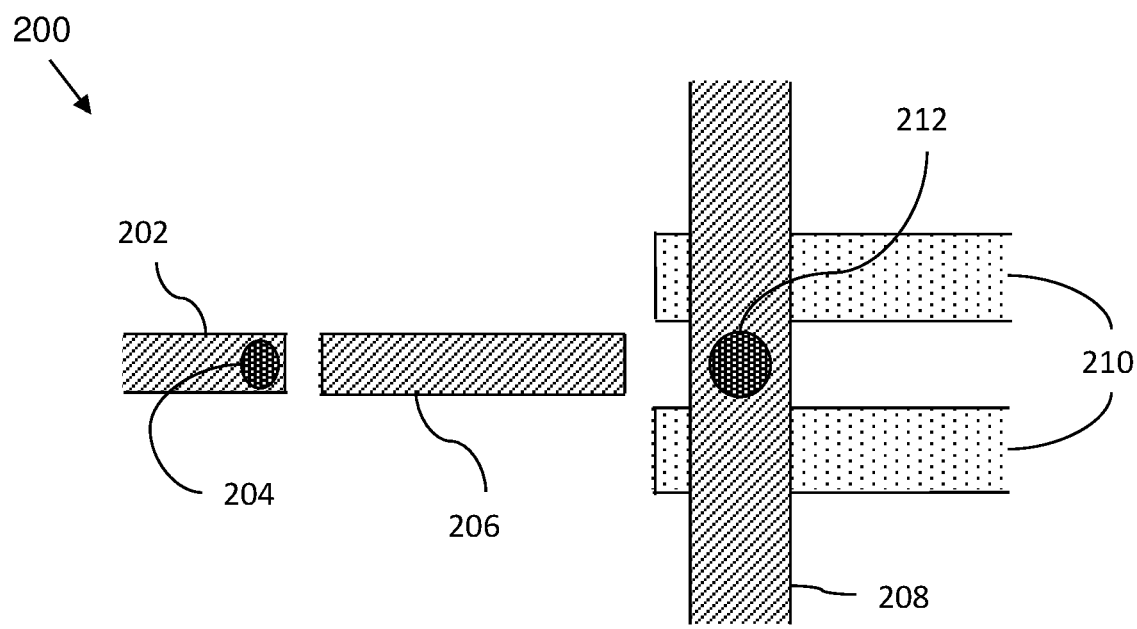
FIG. 2 is an example prior art arrangement for sensing charge events of a quantum dot using a sensing quantum dot and a coupler.

FIG. 2 illustrates this alternative system design. As shown in FIG. 2, a floating conductive material 206 is placed between a quantum dot 204 and an SET 212. The quantum dot 204 is formed by biasing gate 202. The top gate 208 accumulates an electron gas under it such that current can be measured following the pathway defined by the gate 208. Gates 210 are then set to a voltage that forms a barrier for the electron gas, which defines a small region where electrons can tunnel in and out, which defines a single SET. By increasing the length of the floating conductive material 206, the distance between the quantum dot and the SET can be increased, without decreasing the capacitive coupling between the quantum dot 204 and the SET 212. However, this design also suffers from some drawbacks.

In this design, one coupler 206 is placed between one sensor and one quantum dot. Therefore, if a quantum processing element includes n quantum dots, n sensing devices or SETs may be required in this design. This once again affects the footprint of the quantum processing element—increasing the chip size. Further, the capacitive coupling between the quantum dot 204 and the floating conductive material 206 is a function of the distance between the tip of the floating conductive material and the quantum dot. Accordingly, the quantum dots must be placed in close proximity to the floating conductive material in such designs thereby placing high constraints on such system architectures.

Embodiments of the present disclosure are directed to new and inventive device architectures for sensing the charge state of multiple quantum dots. In particular, the presently disclosed embodiments are directed to charge sensing of quantum dots formed in CMOS multi-gate nanowire devices by electrostatically coupling the quantum dots via floating gates, to a remote single electron transistor (SET) formed in an adjacent nanowire. By biasing the gates and/or the nanowire itself in the remote SET in relation to the nanowire hosting the quantum dots, some of the presently disclosed embodiments can form ancillary quantum dots under the floating gates and the SET can be used to sense charge transitions in all the quantum dots—i.e., the initial set and the ancillary set.

Accordingly, the presently disclosed systems increase the number of quantum dots sensed through a single floating coupler and lead to a strong capacitive coupling between the SET and each of the quantum dots. Further, the disclosed devices overcome limitations associated with measurements based on tunnelling transport through the dots and permit the sensing of all charge transitions, down to the last electron in each quantum dot.

These and other aspects of the present disclosure will be described in detail in the following sections.

Example Device Architecture

Figure 3A:
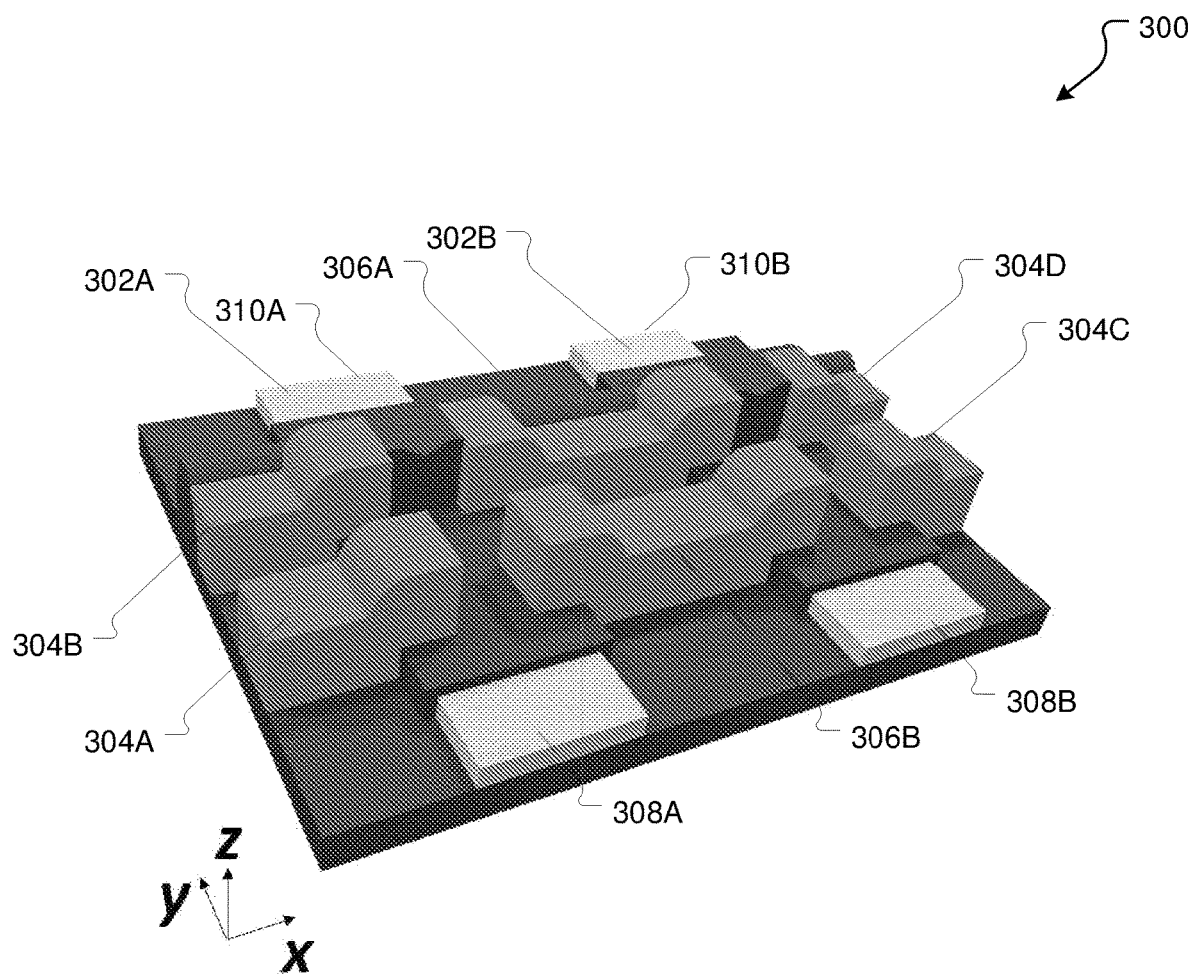
FIG. 3A is a perspective view of a device architecture for sensing charge events of multiple quantum dots using a sensing quantum dot according to some aspects of the present disclosure.
Figure 3B:
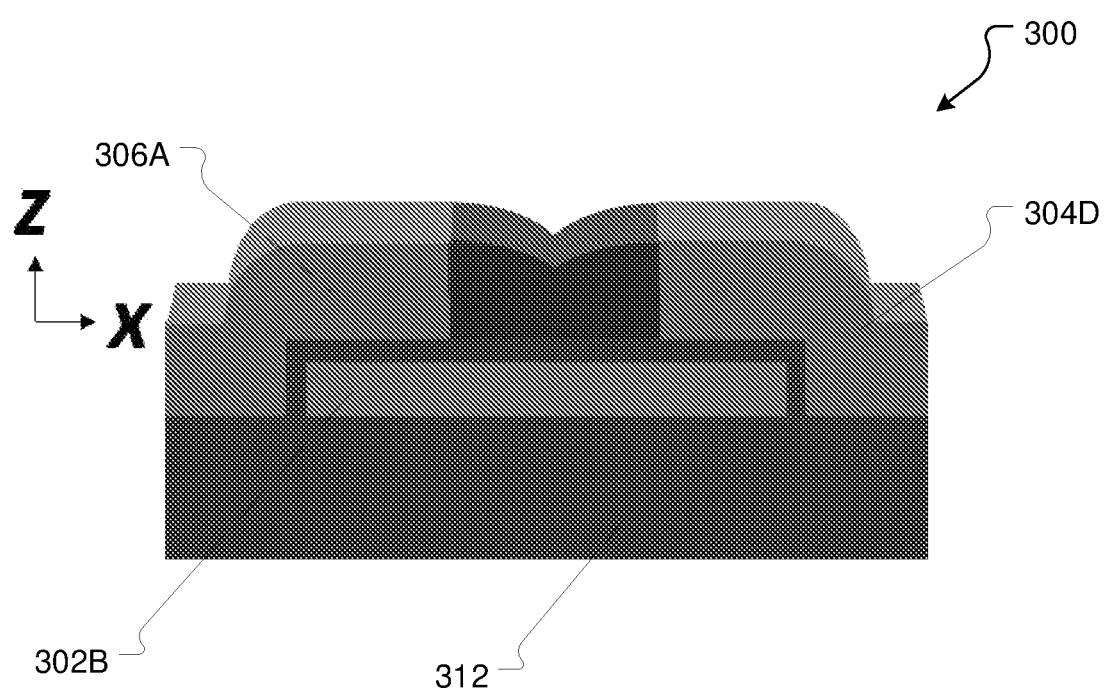
FIG. 3B is a side sectional view of the device architecture of FIG. 3A.
Figure 3C:
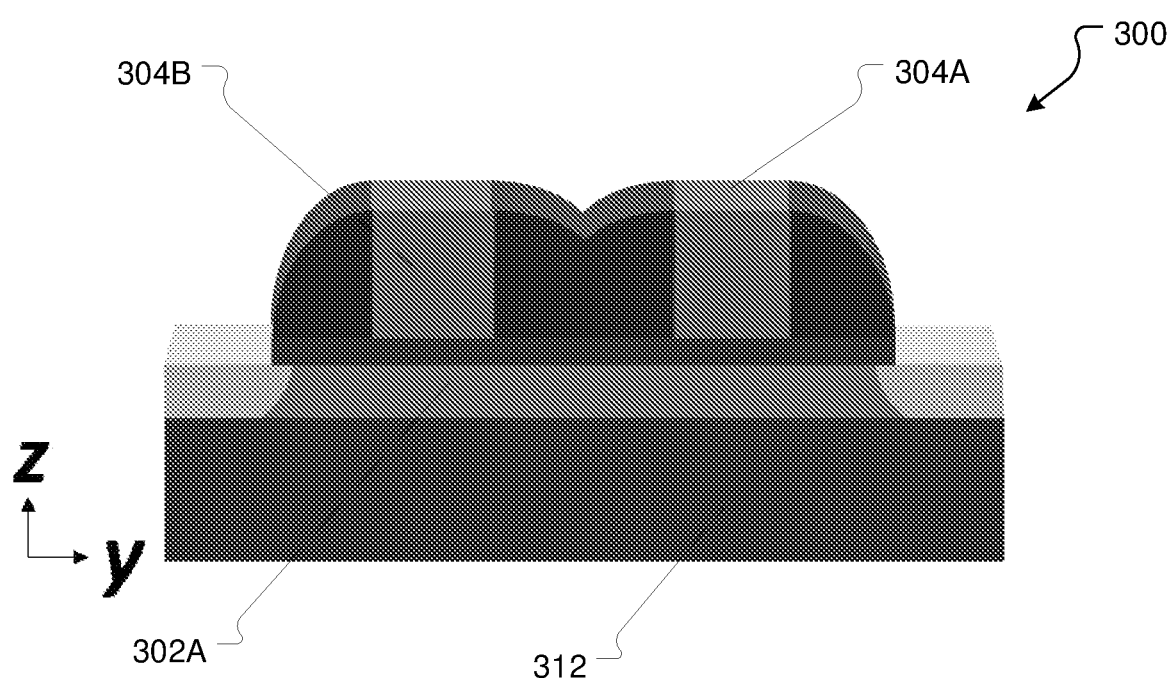
FIG. 3C is another side sectional view of the device architecture of FIG. 3A.

FIG. 3 illustrates an example device architecture 300 for sensing changes in electric charges in multiple quantum dots via a remote SET according to some embodiments of the present disclosure. In particular, FIG. 3A depicts a perspective view of the device architecture 300, FIG. 3B illustrates a sectional side view of the device architecture along the x-z axes and FIG. 3C illustrates a sectional side view of the device architecture along the y-z axes.

The device architecture 300 includes two parallel silicon nanowires 302A and 302B. In one embodiment, the silicon nanowires 302A and 302B are fabricated on a silicon substrate using silicon on insulator (SOI) technology and more particularly, fully-depleted silicon-on-insulator (FD-SOI) technology. For example, the silicon nanowires may be formed by etching $^{28}$Si material on an oxide layer which is, in turn, formed on a silicon substrate. This oxide material is known as buried oxide layer.

In the device architecture 300, gate electrodes 304A and 304B are in proximity to the nanowire 302A and gate electrodes 304C and 304D are in proximity to nanowire 302B. In particular, the gate electrodes 304A, 304B, 304C and 304D may be wrapped over edges of the corresponding nanowires 302A and 302B, such that the oxide layer separates the gates from the corresponding nanowires and electrically isolates the gates from the nanowires.

All four gate electrodes are connected to DC voltage sources for electrostatic control of qubits formed under the gates. In addition to these four gates, the device architecture 300 includes uncontacted gates 306A and 306B which are in proximity to (e.g., partially wrapped over) both the nanowires in a similar manner to gates 304A-304D. The uncontacted gates 306A and 306B serve as floating couplers between the nanowires 302A and 302B, enhancing the electrostatic coupling between the nanowires.

In certain embodiments, the gate electrodes 304A-304D and 306A-B can be made of polysilicon. However, it will be appreciated that the gates can be made of other suitable materials such as Aluminium, Tantalum, Tantalum Nitride, Tungsten, Titanium Nitride, Palladium, and Platinum as well without departing from the scope of the present disclosure.

The two silicon nanowires 302A and 302B can be connected to independent sources (e.g., sources 308A and 308B) and independent drains (e.g., drains 310A and 310B). Further, the electrostatic potential of each of the two nanowires is controlled by their corresponding gates—nanowire 302A is controlled by gates 304A and 304B and nanowire 302B is controlled by gates 304C and 304D.

During operation, a sensing quantum dot or SET is formed in one of the nanowires and functional quantum dots are formed in the other nanowire. For ease of reference, it is assumed that the sensing quantum dot is formed in the nanowire 302B and the functional quantum dots are formed in the nanowire 302A. However, it will be appreciated that this is merely an example, and the placement of the sensing and functional quantum dots can be swapped, such that the sensing quantum dot is formed in the nanowire 302A and the functional quantum dots are formed in the nanowire 302B.

In any case, the sensing quantum dot is formed by applying a positive voltage to the gates 304C and 304D to accumulate a large number of electrons under the gates 304C and 304D. This accumulation of electrons under the gates 304C and 304D causes a sensing quantum dot to be formed under the gates 304C and 304D.

The sensitivity of the sensing quantum dot is a function of the transconductance of the sensing nanowire 302B, which is adjusted by biasing the SET gates, e.g. gates 304D and 304C, with respect to the nanowire drain, 310B.

Figure 4:
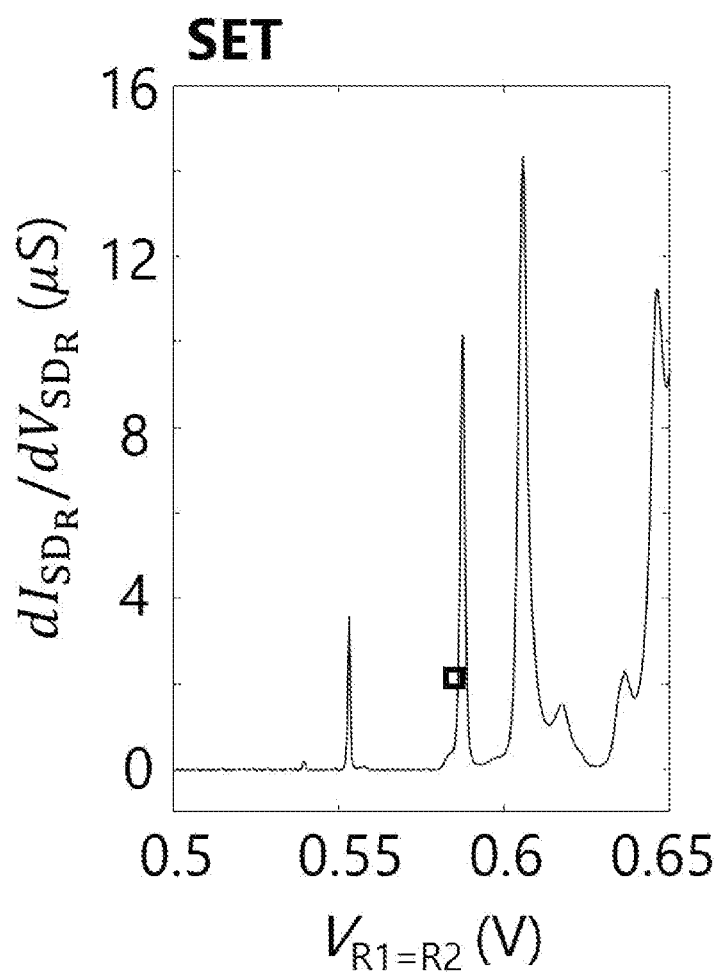
FIG. 4 is a graph illustrating the measured differential conductance of the SET for increasing gate voltages.

Accordingly, during operation, gate voltages for 304C and 304D are set such that current changes more drastically with small changes in the electrostatic environment of the sensing dot. FIG. 4 is a graph 400 illustrating differential conductance in µS (microSiemens) in nanowire 302B for increasing gate 304C and 304D voltages between 0.5V to 0.65V. As seen in this graph, when the gate voltage is about 0.6V, subthreshold Coulomb oscillations occur in the quantum dot under gates 304C and 304D indicating formation of the dot. The square in the graph 400 indicates a point of optimal sensitivity of the current $I_{SDR}$ to changes in the dot chemical potential, which can be used for charge sensing of any quantum dots formed in the nanowire 302A.

Further, in some embodiments, a constant bias of approximately 1 mV (or between 0-2 mV) is applied between the source 308B and drain 310B of the sensor nanowire 302B. This small bias ensures that current in the sensing quantum dot always flows in the same direction.

To form functional quantum dots on nanowire 302A, voltages are applied to the gates 304A and 304B to draw electrons under the gates 304A and 304B. In some embodiments, the range of voltages applied to the gates 304A and 30B may be between 0.1-1V.

Figure 5:
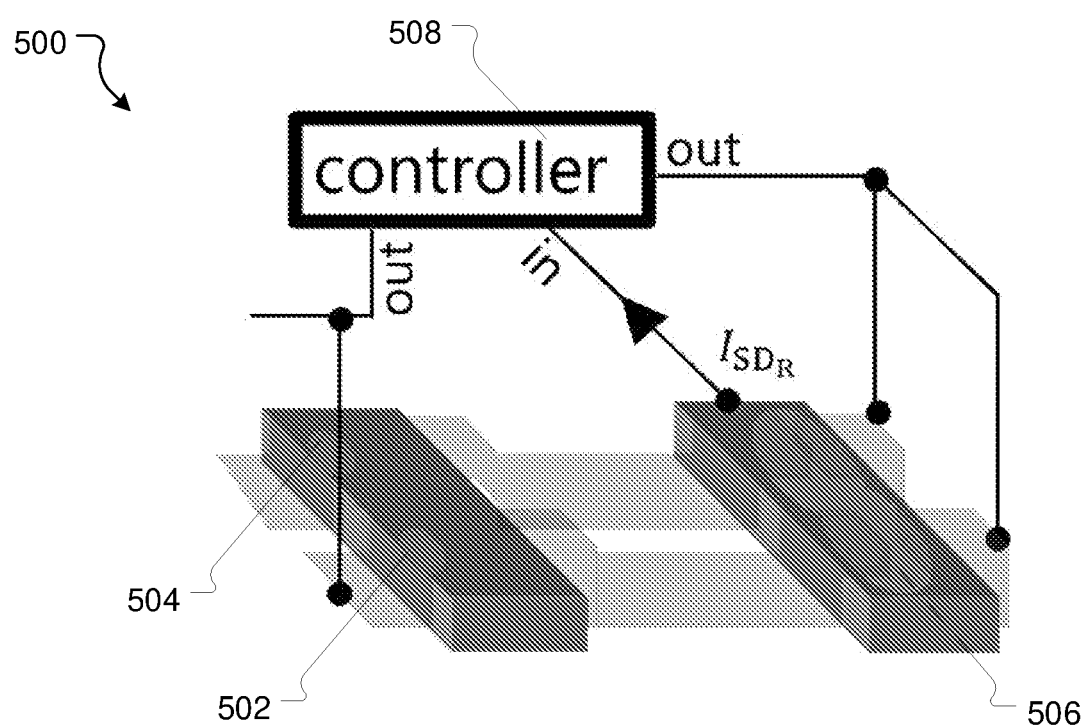
FIG. 5 is a schematic diagram illustrating the simultaneous formation of two functional quantum dots in one nanowire and a sensing quantum dot in the other nanowire in the device architecture of FIG. 3A according to some embodiments of the present disclosure.

FIG. 5 is a schematic illustrating the simultaneous formation of quantum dots 502 and 504 under gates 304A and 304B of nanowire 302A and a large sensing quantum dot in nanowire 302B under both gates 304C and 304D when appropriate bias voltages are applied to all the gates of device 300. As illustrated in FIG. 5, a controller 508 may be employed to apply bias voltages to the gates 304A, 304B, 304C and 304D. The controller 508 may also be configured to receive current ($I_{SDR}$) values from the nanowire 302B. In some embodiments, the controller 508 may control the bias voltages for the gates based on the input current value. The controller 508 can be a software controller or a hardware controller.

Under this operation state, any changes in the charge distribution in nanowire 302A impacts the chemical potential of the sensing quantum dot 506 in the nanowire 302B through the floating electrostatic coupling gates 306A and 306B. The charge transitions are observed either through transport spectroscopy (source-drain current measurement through 302A) or charge sensing (SET current through 302B). This allows monitoring of the quantum dots 502 and 504 down to the last electron. Put another way, when the gate voltage is varied for gate 304A and/or gate 304B, the number of electrons accumulated under the corresponding gate changes—i.e., as the voltage increases, more electrons are drawn under the corresponding gate and as the voltage decreases the number of electrons accumulated under the corresponding gate decreases. Every time the number of electrons under gate 304A or 304B changes, the charge sensing operation point of the sensing quantum dot 506 shifts. Accordingly, any changes in the charge accumulated in nanowire 302A can be detected through a corresponding change in current experienced by the sensing quantum dot 506 in the nanowire 302B.

Figure 6:
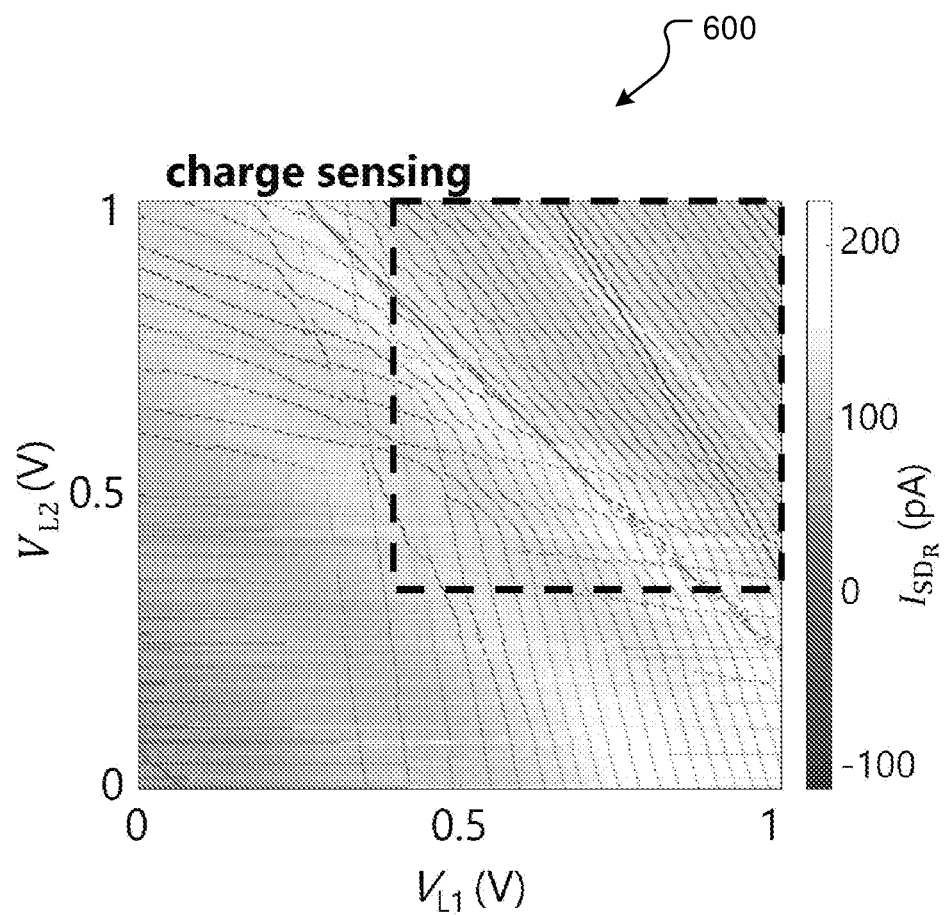
FIG. 6 is a plot of a sensing quantum dot's charge sensing response as a function of gate voltages applied to a remote nanowire.

Further still, from a reading of the charge sensor response to changes in gate voltages of gates 304A and 304B a determination can be made whether the changes in the sensor quantum dot 506 sensitivity are in response to changes in the quantum dot 502 or 504. For example, FIG. 6 is a plot of the sensing quantum dot's charge sensing response as a function of the gate voltages $V_{304A}$ and $V_{304B}$. The more vertical lines in this plot correspond to electrons being added to the quantum dot 502, whereas the more horizontal lines correspond to electrons being added to the quantum dot 504. In each case the addition or removal of electrons from quantum dots in nanowire 302A is detected via changes in the current through the sensor dot 506. Decreased visibility of certain charge transitions is seen where the tunnel rate between the quantum dots and the reservoir (source or drain) becomes too slow. For example, as seen in the portion of the plot corresponding to 0-0.5 V on the x axis and the y axis.

In some embodiments, during operation, two additional quantum dots can be formed on nanowire 302A. These two additional quantum dots are formed under floating gates 306A and 306B and they are formed by creating a potential difference between the nanowires 302A and 302B. Further, if the electrostatic potential of the sensing nanowire (i.e., nanowire 302B) is higher than the electrostatic potential of the functional nanowire (i.e., nanowire 302A), the sensing nanowire can induce electrons to accumulate under the gates 306A and 306B where the gates are capacitively coupled the functional nanowire 302A thereby forming quantum dots under 306A and 306B in the functional nanowire 302A.

Figure 7:
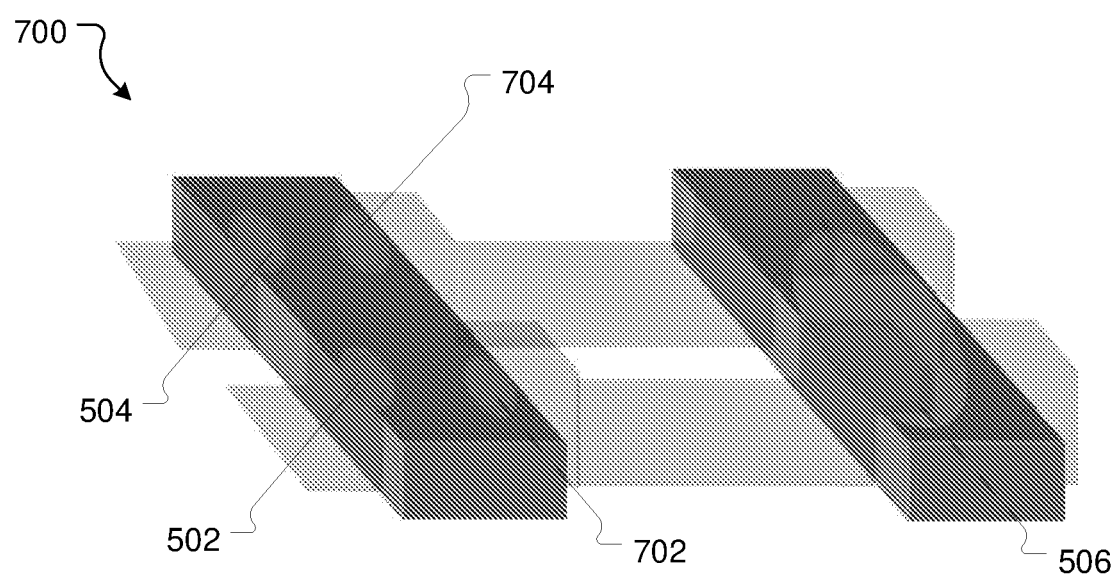
FIG. 7 is a schematic diagram illustrating formation of four functional quantum dots in one nanowire and a sensing quantum dot in the other nanowire in the device architecture of FIG. 3A according to some embodiments of the present disclosure.

FIG. 7 is a schematic diagram illustrating formation of four functional quantum dots in the nanowire 302A and the formation of a sensing quantum dot in the nanowire 302B. As seen in the Figure, the four functional quantum dots include quantum dots 502 and 504 and quantum dots 702 and 704 formed under gates coupling gates 306A and 306B.

Figure 8:
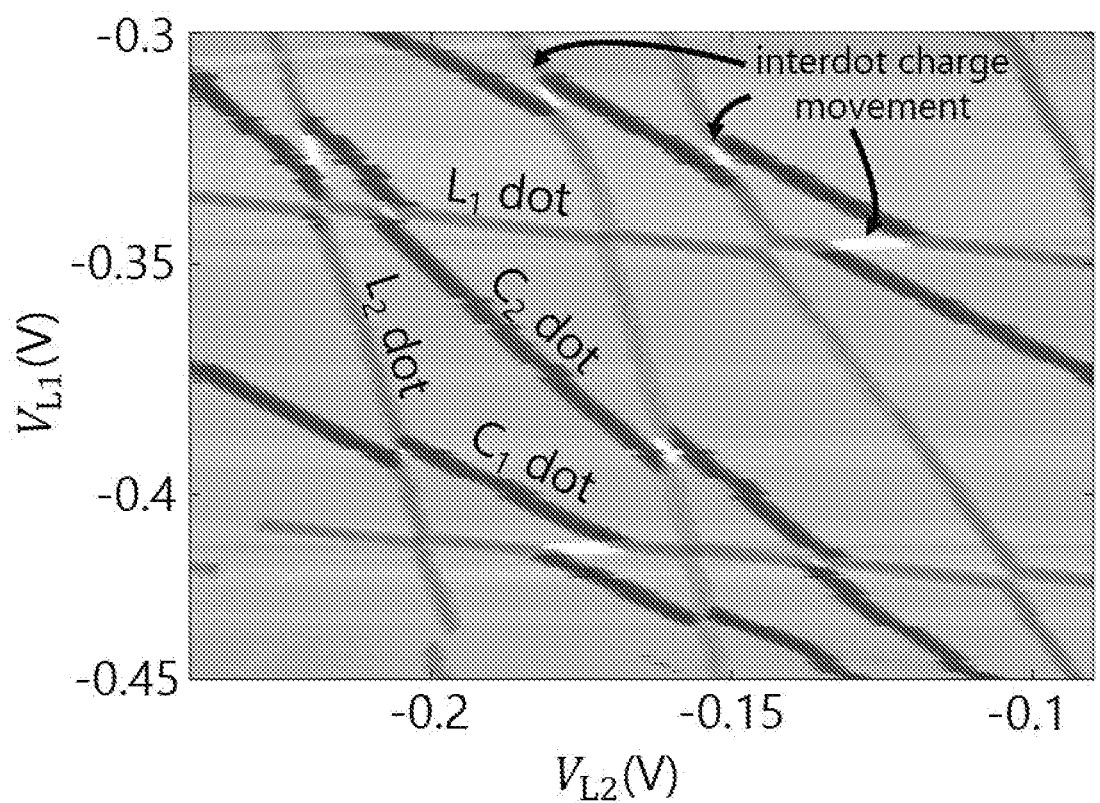
FIG. 8 is a plot illustrating the charge sensing spectroscopy of the four quantum dots of FIG. 7.

FIG. 8 is a plot 800 illustrating the charge sensing spectroscopy of the four quantum dots—dots 502, 504, 702 and 704. As seen in the plot, all charge transitions are distinguishable due to their different electrostatic couplings to gates 304A and 304B and to the sensor quantum dot 506, leading to different angles and contrasts in the colour plot (colour scales are the same in both plots). The transitions at more vertical and horizontal angles with less contrast in charge sensing refer to changes in the number of electrons at the dots under gate 304A (horizontal) and gate 304B (vertical). The transitions at intermediate angles with higher contrast refer to the addition of electrons to the quantum dots 702 (more horizontal) and 704 (more vertical). The transitions corresponding to the quantum dots under gates 304A and 304B are nearly perpendicular to their respective axes because the quantum dots under these gates have stronger coupling to the biased gates whereas the transitions corresponding to the quantum dots under coupling gates 306A and 306B have intermediate angles because these quantum dots have a weaker coupling to the biased gates. Secondly, the transitions of the quantum dot 702 and 704 have a higher signal to noise ratio compared to the transitions of the quantum dot 502 and 504 as the quantum dots 702 and 704 have a stronger coupling to the sensor nanowire 302B, again mediated by the floating gates 306A and 306B. White regions in the plot 800 represent transitions where an electron moves away from the SET sensor instead of towards it. This can occur for example when an electron moves from quantum dot 704 to quantum dot 504, effectively a movement of negative charge away from the sensor. For all other darker transitions, an electron is added from the source or drain reservoirs, effectively a movement of negative charge towards the sensor. This is a common technique known in the art for identifying direction of charge movement In general, any form of orbital or valley degeneracy is detrimental for quantum computing, which can lead to fast spin relaxation and undermining exchange coupling between spins. In the context of spin qubit readout, the added degree of freedom may hinder spin blockade. In order to guarantee a priori that no undesirable degeneracy is present, it is necessary to know the electronic structure of the dot well, which can be a very challenging issue for many electron qubits. In particular examples of very small, highly symmetric quantum dots, it is possible to recognise the shell structure of the dot and consider electronic interactions as a small perturbation, similar to what is done in atomic physics. In a more general case such as the corner dots in a nanowire, the electronic structure and excitation spectrum may not bear an easily recognisable labelling in terms of quantum numbers. In these conditions, it is desirable to operate at low electron occupancies.

Figure 9:
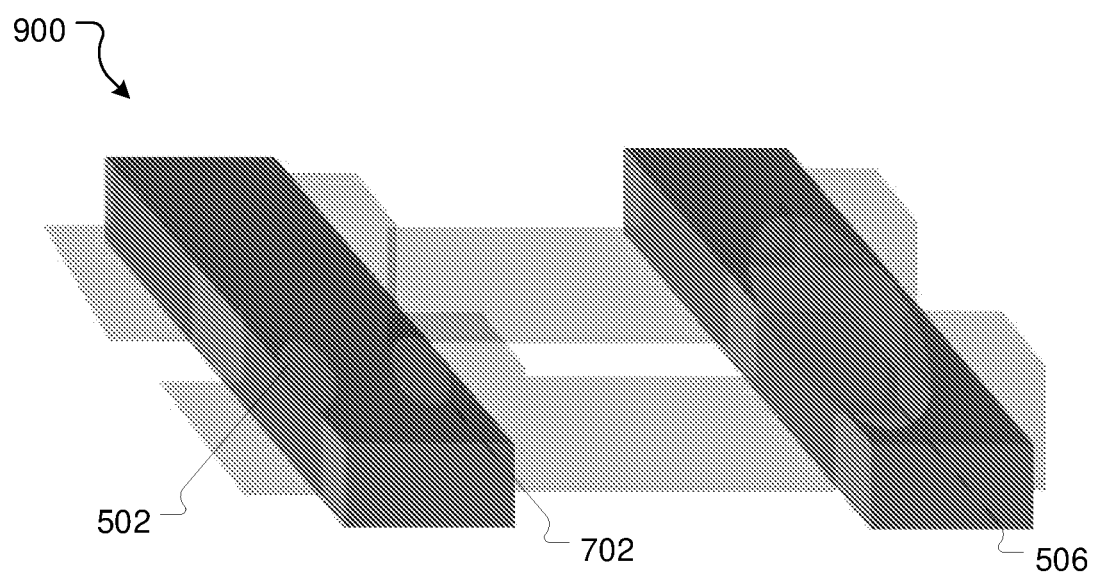
FIG. 9 is a schematic diagram illustrating formation of two functional quantum dots in one nanowire and a sensing quantum dot in the other nanowire in the device architecture of FIG. 3A according to some embodiments of the present disclosure.
Figure 10:
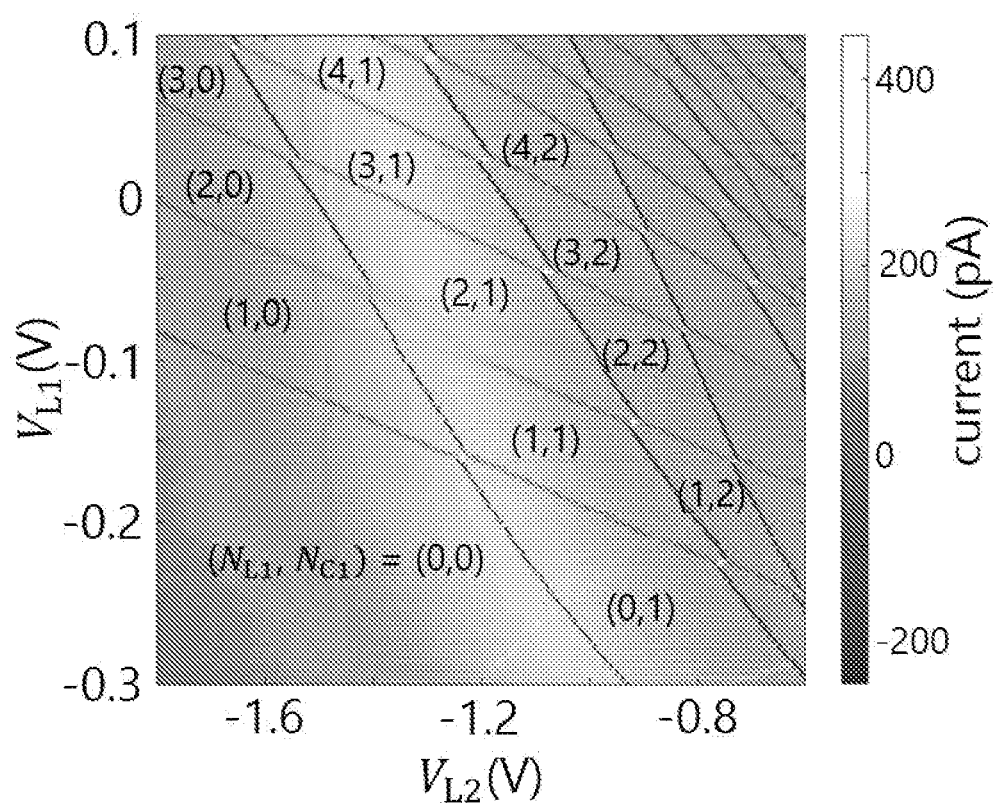
FIG. 10 is a plot illustrating the charge sensing spectroscopy of the two functional quantum dots of FIG. 9.

In light of this, in some embodiments, instead of forming four quantum dots on the nanowire 302A, two quantum dots can be formed—e.g., under gates 304A and 306B. This formation of two quantum dots is shown in FIG. 9. In some embodiments, this can be achieved by depleting the quantum dots formed under gates 304B and 306A completely and accumulating a few electrons under the gates 304A and 306B. The charge stability diagram of this configuration is illustrated in FIG. 10 and it indicates that a well-defined double quantum dot is formed with distinguishable charge configurations for various dot occupancies of interest for quantum computation.

Figure 11:
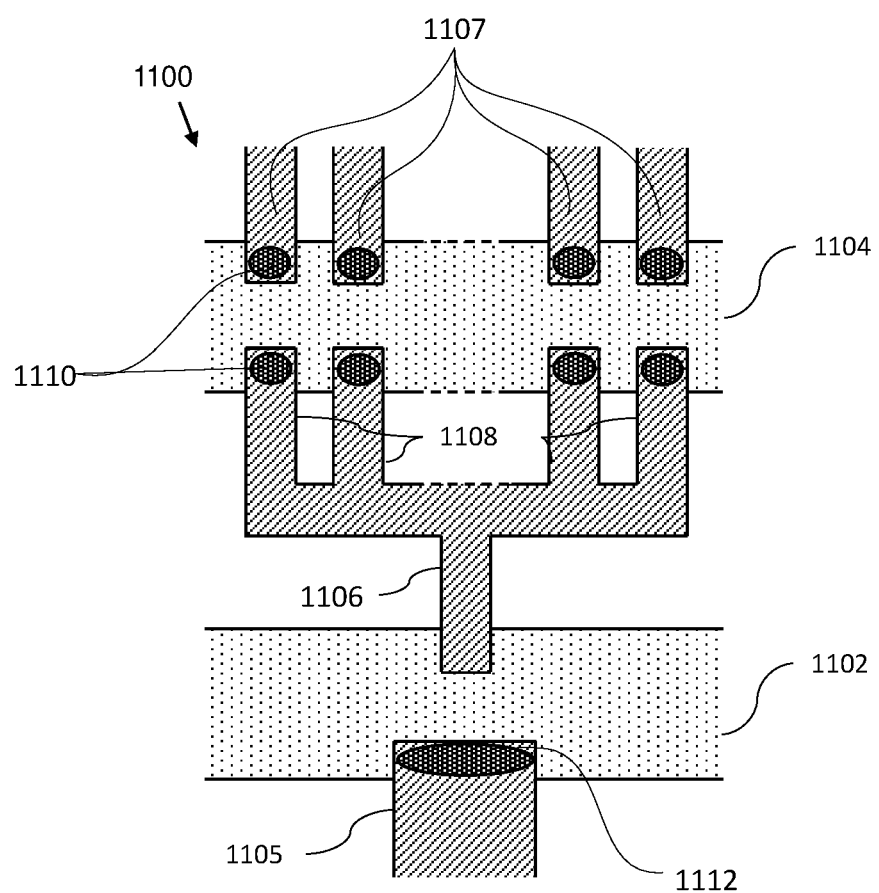
FIG. 11 is a schematic diagram of another embodiment of a device architecture for sensing charge events of multiple quantum dots using a sensing quantum dot according to some aspects of the present disclosure.
Figure 12:
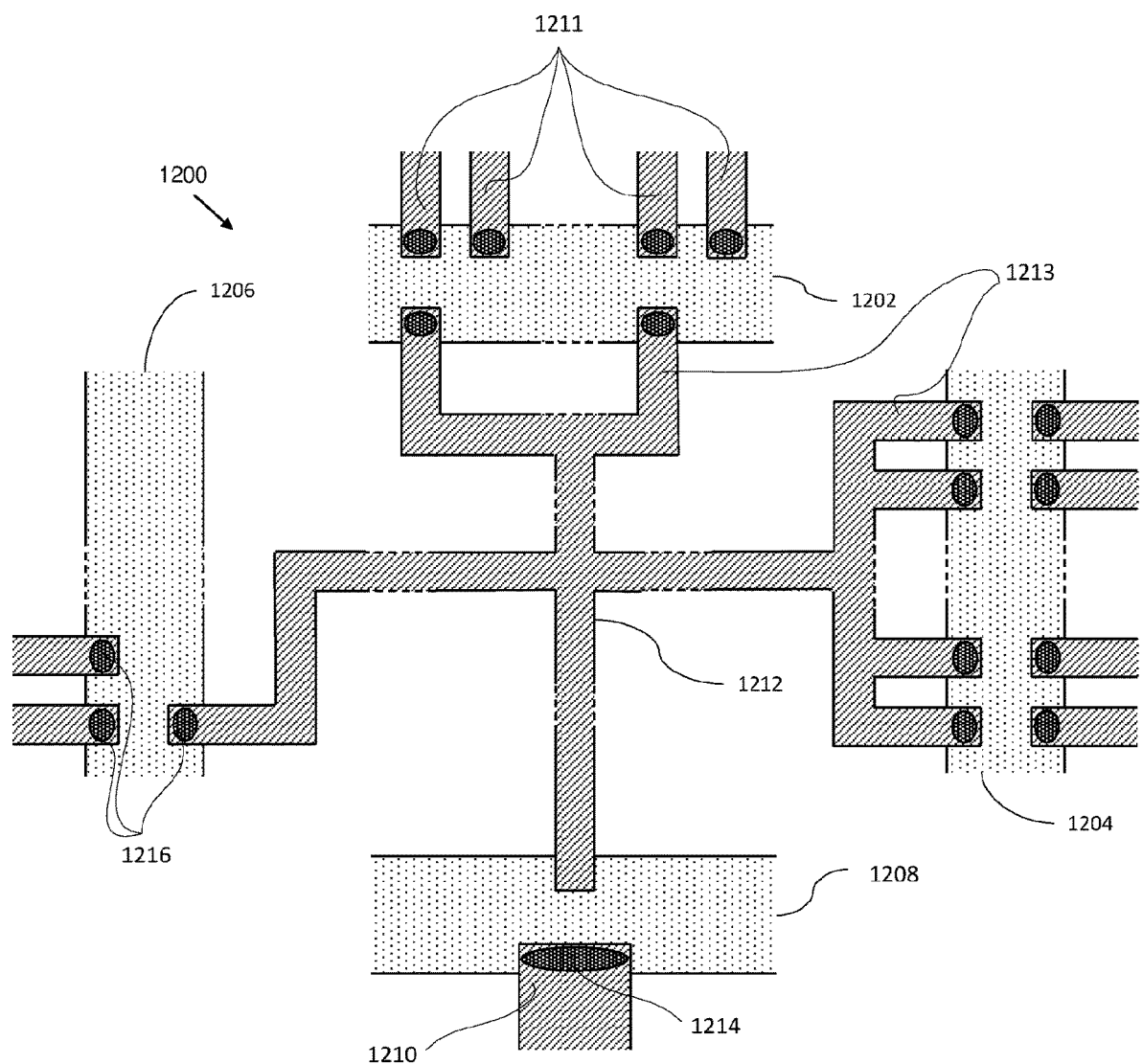
FIG. 12 is a schematic diagram of yet another embodiment of a device architecture for sensing charge events of multiple quantum dots using a sensing quantum dot according to some aspects of the present disclosure.

FIGS. 3-10 illustrate a two-nanowire structure where one sensing quantum dot on one of the nanowires can be used to sense changes in electric charges on up to four functional quantum dots on the other nanowire. However, it will be appreciated that this concept of electrostatically coupling nanowires via floating couplers and sensing the functional quantum dots on one nanowire via a sensing quantum dot on the other nanowire can be extended for a larger number of quantum dots. FIGS. 11 and 12 illustrate two such example structures.

Alternative Architectures

FIG. 11 shows an example device architecture 1100 for an extended quantum processing system. Similar to the device architecture 300 shown in FIG. 3, this device architecture includes two nanowires—a sensing nanowire 1102 and a functional nanowire 1104. Each nanowire includes an independent source and drain. Further, the sensing nanowire 1102 includes one or more gates. FIG. 11 shows one gate, gate 1105 and the functional nanowire 1104 includes multiple gates 1107A-1107N. The two nanowires are electrostatically coupled to each other via a floating coupler 1106. The floating coupler 1106 includes a floating gate spanning between the sensor nanowire 1102 and the functional nanowire 1104. One end of the floating coupler is coupled with the sensing nanowire 1102 whereas the other end of the floating coupler 1106 has multiple branches 1108A-N which wrap over edges of the functional nanowire 1104. In one embodiment, these branches 1108 of the floating coupler 1106 may be equal in number to the gates 1107A-N of the functional nanowire 1104. Further in some embodiments, the branches 1108 may be wrapped over edges of the functional nanowire 1104 at approximately the same longitudinal positions as the gates 1107. In other embodiments, they may be wrapped over edges of the functional nanowire 1104 at different longitudinal positions.

During operation, functional quantum dots 1110 can be formed under one or more of the gates 1107 and gates 1108 as described above with respect to the device architecture 300. Further, a sensing quantum dot 1112 can be formed under the gate 1105. In this manner, the device architecture 1100 allows a single SET charge sensor 1112 to be electrostatically coupled to many functional quantum dots 1110 across a large distance.

FIG. 12 illustrates another example device architecture 1200 for an extended quantum processing system.

This device architecture includes multiple functional nanowires—see nanowires 1202, 1204 and 1206 and a sensing nanowire 1208. Each nanowire may have its own independent source and drain. Further, similar to sensing nanowire 302B and 1102, the sensing nanowire 1208 includes one or more gates 1210. Each of the functional nanowires 1202-1206 includes multiple gates 1211. The nanowires are electrostatically coupled via a floating gate 1212, which spans between the sensor nanowire 1208 and the multiple functional nanowires 1202-1206.

In this device architecture, the floating coupler 1212 has a tree structure comprising a trunk, branches and leaves. The trunk end of the floating coupler 1212 is wrapped over an edge of the sensing nanowire 1208 and the multiple branches of the floating coupler (three in this embodiment) are wrapped over edges of the three functional nanowires. Each branch ends in leaf gates 1213—which may correspond in number and alignment with the gates of the corresponding functional nanowires. However, this might not always be the case and in some embodiments, the number or position of the leaf gates may not correspond to the number and/or position of the gates of the corresponding functional nanowires.

During operation, a sensing quantum dot 1214 may be formed under the gates of the sensing nanowire 1208 and functional quantum dots 1216 may be formed under one or more of the gates 1211 and leaf gates 1213 (e.g., using the process described with respect to FIGS. 3-10). Further, the sensing quantum dot 1214 may be electrostatically coupled to each of the functional quantum dots 1216 such that it can sense any charge events (or changes in electric charge) in these functional dots. Accordingly, in this embodiment, the device architecture 1200 allows for coupling a sensing quantum dot with multiple quantum dots residing in multiple nanowires.

The architectures described until now utilize a floating coupler to electrostatically couple a sensing nanowire to one or more functional nanowires. In other embodiments, the floating coupler may be utilized to couple two or more functional nanowires with each other. For example, a floating coupler may be employed between two functional nanowires—each nanowire having one or more functional quantum dot—to electrostatically couple the two functional nanowires. In another example, a floating coupler may be employed to couple two clusters of quantum nanowires. In this example, the floating coupler may be utilized between ends of the two clusters to electrostatically couple quantum dots from one cluster with the quantum dots from the other cluster.

It will be appreciated that the architectures described in the embodiments above utilize electrons in the quantum dots. In other embodiments, the quantum dots can be configured to confine holes instead of electrons.

The term "comprising" (and its grammatical variations) as used herein are used in the inclusive sense of "having" or "including" and not in the sense of "consisting only of".

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A quantum processing system device comprising:
   one or more functional nanowires, each functional nanowire connected to at least one of a first source and a first drain;
   a sensing nanowire spaced from the one or more functional nanowires and connected to at least one of a second source and a second drain;
   one or more first gate electrodes capacitively coupled with each of the one or more functional nanowires;
   one or more second gate electrodes capacitively coupled with the sensing nanowire; and
   one or more floating electrostatic coupling gates positioned between and electrostatically coupling the one or more functional nanowires and the sensing nanowire, the one or more floating electrostatic coupling gates being partially overlapped with each of the one or more functional nanowires and the sensing nanowire; and
   a controller connected to the one or more second gate electrodes of the sensing nanowire and the one or more first gate electrodes of the one or more functional nanowires;
   wherein the controller is configured to apply biasing voltage to bias the one or more second gate electrodes of the sensing nanowire and the one or more first gate electrodes of the one or more functional nanowires such that a sensing quantum dot is formed in the sensing nanowire and one or more functional quantum dots are formed in the one or more functional nanowires and the sensing quantum dot senses changes in electric charges in each of the one or more functional quantum dots.

2. The quantum processing system of claim 1, wherein the quantum processing system includes one functional nanowire and the functional nanowire includes two second gate electrodes.

3. The quantum processing system of claim 2, wherein the one or more floating electrostatic coupling gates comprises two floating electrostatic coupling gates.

4. The quantum processing system of claim 1, wherein during operation of the quantum processing system, a potential difference between the sensing nanowire and the one or more functional nanowires forms one or more functional quantum dots in the one or more functional nanowires under the one or more floating electrostatic coupling.

5. The quantum processing system of claim 4, wherein to form the one or more functional quantum dots under the one or more floating electrostatic coupling gates in the one or more functional nanowires, the sensing nanowire and the one or more functional nanowires are biased in voltage relative to each other.

6. The quantum processing system of claim 1, wherein the sensing nanowire includes two second gate electrodes and the two second gate electrodes are biased to a same voltage.

7. The quantum processing system of claim 1, wherein the quantum processing system includes one functional nanowire and the one functional nanowire includes multiple first gate electrodes.

8. The quantum processing system of claim 7, wherein at one end, the one or more floating electrostatic coupling gates are coupled with the sensing nanowire and at a second end the one or more floating electrostatic coupling gates include multiple branches, where each branch is coupled with the one functional nanowire.

9. The quantum processing system of claim 8, wherein a potential difference between the sensing nanowire and the one functional nanowire to form functional quantum dots under the multiple branches branch gates of the one or more floating electrostatic coupling gates.

10. The quantum processing system of claim 1, wherein the quantum processing system includes multiple functional nanowires and each functional nanowire includes two or more first gate electrodes, wherein the one or more floating electrostatic coupling gates each include a trunk section and multiple branch sections, wherein each branch section comprises one or more leaf gates, wherein an end of the trunk section is coupled with the sensing nanowire, and wherein the one or more leaf gates are coupled with the multiple functional nanowires.

11. The quantum processing system of claim 10, wherein a potential difference between the sensing nanowire and each functional nanowire forms functional quantum dots under one or more of the one or more leaf gates of the one or more floating electrostatic coupling gates.

12. A method for controlling operation of a quantum processing system, the quantum processing system comprising one or more functional nanowires, a sensing nanowire spaced from the one or more functional nanowires, one or more first gate electrodes capacitively coupled with each of the one or more functional nanowires and one or more second gate electrodes capacitively coupled with the sensing nanowire, one or more floating electrostatic coupling gates positioned between and electrostatically coupling the one or more functional nanowires and the sensing nanowire, the one or more floating electrostatic coupling gates being partially overlapped with each of the one or more functional nanowires and the sensing nanowire, and a controller connected to the one or more second gate electrodes of the sensing nanowire and the one or more first gate electrodes of the one or more functional nanowires, the method comprising:
   at the controller, receiving a current reading from the sensing nanowire;
   determining a first biasing voltage to be applied to the one or more second gate electrodes of the sensing nanowire based on the received current reading;
   determining a second biasing voltage to be applied to the one or more first gate electrodes of the one or more functional nanowires based on the received current reading;
   causing the determined first biasing voltage to be applied to the one or more second gate electrodes of the sensing nanowire; and
   causing the determined second biasing voltage to be applied to the one or more first gate electrodes of the one or more functional nanowires;
   wherein the first biasing voltage and the second biasing voltage are determined such that a sensing quantum dot is formed in the sensing nanowire, one or more functional quantum dots are formed in the one or more functional nanowires and the sensing quantum dot senses charge transition events in each of the one or more functional quantum dots.

13. The method of claim 12, wherein the quantum processing system includes one functional nanowire and the one functional nanowire includes two first gate electrodes and the one or more floating electrostatic coupling gates comprise two floating electrostatic coupling gates.

14. The method of claim 13, further comprising:
   causing a potential difference between the sensing nanowire and the one functional nanowire to form one or more functional quantum dots in the one functional nanowire under the one or more floating electrostatic coupling gates.

15. The method of claim 14, further comprising biasing the sensing nanowire and the one functional nanowire in voltage relative to each other to form the one or more functional quantum dots in the one functional nanowire.

16. The method of claim 12, wherein the sensing nanowire includes two second gate electrodes and wherein the method further comprises:
   determining and causing a same first biasing voltage to be applied to the two second gate electrodes of the sensing nanowire.

17. The method of claim 12, wherein the quantum processing system includes one functional nanowire and the one functional nanowire includes multiple first gate electrodes, wherein one end of each floating electrostatic coupling gate is coupled with the sensing nanowire and an opposite end of each floating electrostatic coupling gate includes multiple branches, and wherein each branch is coupled with the one functional nanowire.

18. The method of claim 17, comprising: biasing the sensing nanowire and the one functional nanowire in voltage relative to each other to form functional quantum dots under one or more of the multiple branches of the floating electrostatic coupling gate.

19. The method of claim 12, wherein the quantum processing system includes multiple functional nanowires and each functional nanowire includes two or more first gate electrodes, wherein the one or more floating electrostatic coupling gates each include a trunk section and multiple branch sections, wherein each branch section comprises one or more leaf gates, wherein an end of the trunk section is coupled with the sensing nanowire, and wherein the one or more leaf gates are coupled with the multiple functional nanowires.

20. The method of claim 19, further comprising:
   biasing each functional nanowire in voltage relative to the sensing nanowire to form functional quantum dots under one or more of the one or more leaf gates of the floating electrostatic coupling gate.

* * * * *